(12) United States Patent
Zeng et al.

(10) Patent No.: US 7,155,239 B2
(45) Date of Patent: Dec. 26, 2006

(54) METHOD AND SYSTEM FOR RADIO MAP FILTERING VIA ADAPTIVE CLUSTERING

(75) Inventors: Guang Zeng, Selden, NY (US); David P. Goren, Smithtown, NY (US); Hoai Xuan Vu, Westminster, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 153 days.

(21) Appl. No.: 10/856,965

(22) Filed: May 28, 2004

(65) Prior Publication Data

US 2005/0266855 A1 Dec. 1, 2005

(51) Int. Cl.
*H04Q 7/20* (2006.01)
(52) U.S. Cl. .................. 455/456.1; 455/456; 455/410; 707/5
(58) Field of Classification Search ............. 455/456.1, 455/456; 707/5
See application file for complete search history.

(56) References Cited

U.S. PATENT DOCUMENTS

| | | | |
|---|---|---|---|
| 6,104,344 A | | 8/2000 | Wax et al. |
| 2003/0008668 A1* | | 1/2003 | Perez-Breva et al. ........ 455/456 |
| 2004/0072577 A1* | | 4/2004 | Myllymaki et al. ...... 455/456.1 |
| 2005/0148339 A1* | | 7/2005 | Boman et al. ............ 455/456.1 |
| 2005/0246334 A1* | | 11/2005 | Tao et al. ....................... 707/5 |

FOREIGN PATENT DOCUMENTS

| | | | |
|---|---|---|---|
| WO | WO 02/054813 | * | 11/2002 |
| WO | WO 03/092318 A1 | | 11/2003 |

OTHER PUBLICATIONS

P. Bahl and V.N. Padmanabhan, Radar: An In-Building RF-Based User Location and Tracking System, Proc. IEEE Infocom, IEEE Press, 2000, pp. 775-784, Piscataway, NJ.
P. Bahl and V.N. Padmanabhan, Enhancements to the RADAR User Location and Tracking System, Feb. 2000, pp. 1-13, Redmond, WA.
Siddhartha Saha et al., Location Determination of a Mobile Device Using IEEE 802.11b Access Point Signals, Wireless Communications and Networking, WCNC 2003, IEEE Mar. 16-20, 2003, p. 1987-1992. USA.

* cited by examiner

*Primary Examiner*—Lester G. Kincaid
*Assistant Examiner*—Charles Shedrick
(74) *Attorney, Agent, or Firm*—Ingrassia, Fisher & Lorenz, P.C.

(57) ABSTRACT

A method for estimating a location of a wireless device in a wireless local network is provided. The method includes forming a first set comprised of the signal strength received from access points that the wireless device received a signal from and an indicator of no signal strength measured for access points that the wireless device did not receive a signal from. Next, a scan subset can be formed comprised of access points in the first set that has associated signal strength. Next, a cluster comprised of the calibration points can be formed based on the scan subset. A distance between the first set and each of the calibration point in the cluster can be calculated. Then, the smallest distance can be selected as the location estimate.

18 Claims, 3 Drawing Sheets

METHOD AND SYSTEM FOR RADIO MAP FILTERING VIA ADAPTIVE CLUSTERING

TECHNICAL FIELD OF THE INVENTION

This invention relates to the field of real time location systems and, more particularly, to a method and system for location estimation in wireless local area networks via adaptive clustering.

BACKGROUND OF THE INVENTION

Object location based on the received signal strength (RSSI) of a signal transmitted from reference objects has applications in many different fields of endeavor. For example, objects having small transceiver affixed to them can be tracked throughout a warehouse. Also, user of wireless devices can determine their locations in an environment using the RSSI received from reference devices.

One prior art method for locating an object RSSI calculates the signal space distance from calibration points within a wireless location system. In one particular prior art method, the location can be determined by calculating a distance in signal space between the current sample point and calibration points.

As an example, an area has a total of four reference-devices. At a given point in time, a wireless device will scan the wireless channels to determine the RSSI received from each reference device. The result can be written as a set of n RSSI measurements. For example, if the set of the reference device RSSIs at a given location can be called the sample, S, then the set of RSSI measured from each reference point will give S: $\{AP_1, AP_2, AP_3, AP_4\}$. The sample set can then be compared to the RSSIs of various calibration points. Each of the calibration points will have their own set of received signal strengths measurements from each reference device. The comparison can be done by calculating the Euclidean distance from each calibration point to the sample using the measured signal strengths and choosing the calibration point closest (having the smallest separation) to the sample set. The sample can be estimated to be located near that calibration point. This algorithm is discussed in "RADAR: An in-building RF based user location and tracking system", by Parumuir Bahl and Venkata N. Padmanabhan, and published in Preceding of INFOCOM, 2000.

This method has several drawbacks. First, it assumes that the receiver can receive signal from all transmitters at all the time, thus failing to handle the situation where only a subset of the transmitters can be heard by the receiver, which is the typical case in large scale network. Second, since it fails to filter calibration points, all calibration points must be checked against the sample. As the number of reference devices and calibration points increase, the computational load and power consumption increases as well. Also, it is possible that the location algorithm can be thrown off by certain calibration points if all calibration points are used. What is need is a method and system for location estimation on wireless local networks via adaptive clustering.

SUMMARY OF THE INVENTION

A method for estimating a location of a wireless device in a wireless network and calibration points is provided in accordance with one exemplary embodiment of the present invention. The method includes forming a first set comprised of the signal strength received from reference devices that the wireless device received a signal from and an indicator of no signal strength measured for reference devices that the wireless device did not receive a signal from. Next, a scan subset can be formed comprised of reference devices in the first set that has associated signal strength. A cluster comprised of the calibration points can be formed based on the scan subset. A distance between the first set and each of the calibration point in the cluster can be calculated. Then, the smallest distance can be selected as the location estimate.

In one aspect of the present invention, the step of forming a cluster further comprises forming a cluster comprising calibration points that contain exactly the same reference devices as the scan subset.

In another exemplary embodiment of the present invention, a system for estimating the location of a wireless device in a wireless network is disclosed. The system includes a plurality of reference devices distributed throughout the wireless network. The system also includes a plurality of calibration points distributed throughout the wireless network. A radio map can be formed from the signal strength received from the reference devices at each of the calibration points. The wireless device can be located in the network and can be operable to form a scan set comprising the signal strength received from each of the plurality of reference devices, and form a scan subset of the scan set comprising reference devices in the scan set that have an associated signal strength. The wireless device can be further operable to form a cluster set comprising cluster points selected from the radio map based on the scan subset. The location of the wireless device can be estimated by calculating the distance between scan subset and each of the calibration points in the cluster subset and choosing the calibration point associated with the smallest distance as the location estimate.

BRIEF DESCRIPTION OF THE DRAWINGS

The present invention will hereinafter be described in conjunction with the following drawing figures, wherein like numerals denote like elements, and.

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description A method for determining the location of an object in a wireless network using a clustering method in which any calibration point not in the same cluster is not used in the calculation to determine location. Thresholding techniques can be used to further improve the calculation.

Figure 1:
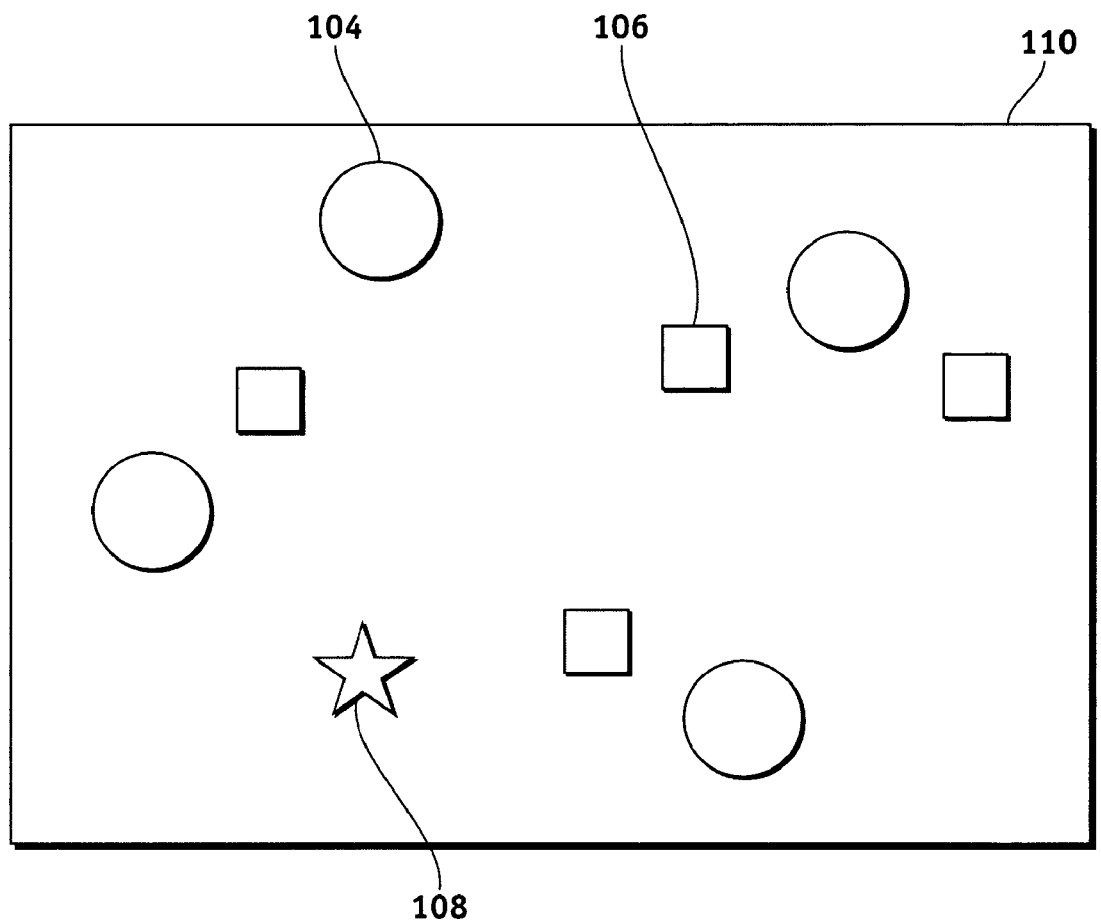
FIG. 1 illustrates multiple reference devices and calibration points in a wireless network in accordance with one exemplary embodiment of the present invention.

An exemplary environment for the use of the present invention is illustrated in FIG. 1. FIG. 1 illustrates an area 102, which can be any area 102, enclosed or otherwise, where a number of wireless reference devices 104 are deployed, typically as part of a wireless network. Also provided are a number of calibration points 106. A wireless device 108, which can be any mobile device capable of wireless communications, is within the area 102.

The reference devices 104 transmit signals to aid in the location of objects within the area covered by the reference devices. In one embodiment, reference device 104 can be an access point in a wireless local area network.

Wireless device 108 can be any device capable of wireless communications. For example, wireless device 108 can be a radio frequency ID tag, a wireless handled computer device such as a personal digital assistant with integrated wireless communication capabilities, a laptop computer with wireless communication ability, a wireless data terminal and the like. In one embodiment, wireless device 108 includes a receiver or transceiver for receiving signals from reference devices, a memory for saving data needed to determine a location and a processor to perform such calculations.

Prior to determining the location of the wireless device 108, a radio map is formed. This can be done by taking a survey at each calibration point 106. To take a survey, a wireless device can be used at each calibration point 106 to listen for transmissions from the reference devices 104. The signal strength from each reference device 104 heard at that calibration point can be recorded. This process can be repeated several times and the signal strength values are typically averaged. After the survey is completed, the RSSI values for each of the reference devices 104 as measured at each calibration point 106 and the coordinate of each calibration point 106 are stored at any location in the network. For example, the radio map can be stored at the wireless device 108, at the reference device 104, at a server computer coupled to the wireless network (not pictured) or another location.

Once the survey has been completed at every calibration points the radio map is compete. Then, a wireless device 108 that is to be located can perform a scan. A scan is like a survey that is done by the wireless device 108 but with an unknown location. In the scan, the wireless device records a signal strength for each reference device 104 in the network. If the wireless device 108 did not receive a signal from a reference device 104, the strength can be set as not available (NA) or no available number (NAN). The signal strength for each reference device 104 as recorded by a wireless device 108 can be arranged as a set of signal strength. Once this information is obtained, the signal strengths found in the scan can be compared with the signal strengths of the calibration point 106 to find an estimated location of the wireless device 108. The calculation can be done at the wireless device 108, the reference device 104, at a server computer or another location.

Prior to discussion of the location methods of the present, two lemmas need to be established. The first lemma is that the variance of received signal strength when expressed in decibels is a constant. The second lemma is that the higher the received signal strength from a specific access point, the higher the probability that the data (typically in terms of packets) can be received from this access point.

To establish that the variance of RSSI (in decibels) is a constant number, it is first noted that in indoor mobile radio channels, the well known Rayleigh distribution can be used to describe the statistical time varying nature of the received envelope of a flat fading signal. Based on this assumption, we can calculate the variance of RSSI by use of the probability density function of the Rayleigh distribution.

The probability density function (pdf) of received envelope v is given by:

$$f(v) = \frac{1}{\sigma^2}\exp\left(-\frac{v^2}{2\sigma^2}\right), 0 \leq v \leq \infty \quad (1)$$

Then the pdf of received power, P, where $P=v^2$, is the following exponential:

$$f(P) = \frac{1}{\sigma^2}\exp\left(-\frac{P}{2\sigma^2}\right), 0 \leq P \leq \infty \quad (2)$$

-continued $$= \frac{1}{\mu}\exp\left(-\frac{P}{\mu}\right)$$

The received signal strength indication (RSSI) is measured in on a decibel scale, where $PdB=10 \log 10(P/10^{-3})$. The mean and variance of PdB is as following (where $E(P)=\mu$ and $Var(P)=\mu^2$):

$$E(P_{dB}) = \int_0^\infty 10 \log_{10}(1000P)f(P)dP \quad (3)$$
$$= 10\int_0^\infty \log_{10}(P)f(P)dP + 30\int_0^\infty f(P)dP$$
$$= 10\int_0^\infty \log_{10} P \cdot f(P)dP + 30$$
$$= 10\int_0^\infty \log_{10} P \cdot \frac{1}{\mu}\exp\left(-\frac{P}{\mu}\right)dP + 30$$
$$= 10\int_0^\infty \log_{10}\left(\frac{P}{\mu}\mu\right)\cdot\exp\left(-\frac{P}{\mu}\right)d\frac{P}{\mu} + 30$$
$$= 10\int_0^\infty \log_{10}(y\mu)\cdot\exp(-y)dy + 30$$
$$= 10\int_0^\infty \log_{10}(y)\cdot\exp(-y)dy + 10\log_{10}(\mu) + 30$$

$$E(P_{dB}^2) = \int_0^\infty 100\log_{10}^2(1000P)f(P)dP \quad (4)$$
$$= 100\int_0^\infty (9 + 6\log_{10}P + \log_{10}^2 P)f(P)dP$$
$$= 900 + 600\int_0^\infty \log_{10}Pf(P)dP + 100\int_0^\infty (\log_{10}^2 P)f(P)dP$$
$$= 900 + 600\int_0^\infty \log_{10}\left(\frac{P}{\mu}\cdot\mu\right)\exp\left(-\frac{P}{\mu}\right)d\frac{P}{\mu} + 100$$
$$\int_0^\infty \left(\log_{10}\frac{P}{\mu} + \log_{10}\mu\right)^2 f(P)dP$$
$$= 900 + 600\left[\int_0^\infty (\log_{10}y)\exp(-y)dy + \log_{10}\mu\right] +$$
$$100\left[\int_0^\infty \left(\log_{10}\frac{P}{\mu} + \log_{10}\mu\right)^2 \exp\left(-\frac{P}{\mu}\right)d\frac{P}{\mu}\right]$$
$$= 900 + 600\left[\int_0^\infty (\log_{10}y)\exp(-y)dy + \log_{10}\mu\right] +$$
$$100\left[\int_0^\infty (\log_{10}y + \log_{10}\mu)^2\exp(-y)dy\right]$$
$$= 900 + 600\left[\int_0^\infty (\log_{10}y)\exp(-y)dy + \log_{10}\mu\right] +$$
$$100\left[\int_0^\infty (\log_{10}y)^2\exp(-y)dy + (\log_{10}\mu)^2 +\right.$$
$$\left. 2(\log_{10}\mu)\int_0^\infty (\log_{10}y)\exp(-y)dy\right]$$

$$Var(PdB) = E(PdB2) - [E(PdB)]2 \quad (5)$$
$$= 900 + 600\left[\int_0^\infty (\log_{10}y)\exp(-y)dy + \log_{10}\mu\right] +$$
$$100\left[\int_0^\infty (\log_{10}y)^2\exp(-y)dy + (\log_{10}\mu)^2 +\right.$$
$$\left. 2(\log_{10}\mu)\int_0^\infty (\log_{10}y)\exp(-y)dy\right] -$$
$$\left[10\int_0^\infty \log_{10}(y)\cdot\exp(-y)dy + 10\log_{10}(\mu) + 30\right]^2$$
$$= 100\int_0^\infty (\log_{10}y)^2\exp(-y)dy -$$
$$100\left[\int_0^\infty \log_{10}(y)\cdot\exp(-y)dy\right]^2$$

Therefore, although the mean and variance of the received power are correlated, the variance of RSSI is constant, assuming no noise.

Additionally, the higher the RSSI from a specific reference device 104, the higher the probability that the packet from this reference device 104 can be received. The relationship between the RSSI value and the possibility of receiving a packet is known as the wireless channel information. Since the variance of RSSI due to the Rayleigh fading is a constant number as shown above, and because the receiver cannot resolve the received signal below a certain threshold due to the limitation of the sensitivity of the receiver, it is obvious that the lower the RSSI, the higher the probability that the RSSI will below the receiver's sensitivity level.

The receiver's ability to receive a given signal depends on several factors such as the sensitivity of the receiver, the gain of the automatic gain control in the receiver and the like. Different receiver designs can affect the ability of a receiver.

Using the above information, location methods can be developed in accordance with the teachings of the present invention. The following definitions are used in the discussions that follow.

1) Calibration Sets: $C=\{c_1, c_2 \ldots c_W\}$, calibration points within the area. Here W is the number of calibration points.

2) Current scan: $S: \{pr(1), \ldots pr(M)\}$

3) Reference Devices Set: $AP=\{AP_1, AP_2 \ldots AP_M\}$, total M reference devices.

4) RSSI set: $P_r(n)=\{p_r(n,1), p_r(n,2) \ldots p_r(n, M)\}^T$. M is the number of reference devices. $p_r(n, m)$ is RSSI from the mth reference device.

5) Signal level threshold: $Th_1$ or $Th_2$ value below which the signal will be ignored.

6) RSSIs of calibration points: $PC=\{P_{rC}(1), P_{rC}(2) \ldots P_{rC}(W)\}$, M×W matrix.

7) Clustering: The clustering hereafter refers to the grouping of calibration points that share some features. For example, $c_1:\{11,nan,10,10\}$ and $c_2=\{12,nan,10,11\}$ have the same pattern $F_1$, where $F_1: \{Can\ see\ AP_1, AP_3, AP_4\}$. The pattern is that signals from $AP_1$, $AP_3$ and $AP_4$ can be received. Thus, $c_1$ and $c_2$ can be grouped into a cluster $G_1$. The calibration point $c_3=\{13,nan,nan,nan\}$ belongs to another cluster where only signals from $AP_1$ can be received: $F_1: \{Only\ AP_1\ can\ be\ seen\}$.

A first exemplary location method in accordance with the teachings of the present invention can be described with reference to the flowchart of FIG. 2. In a first step, a scan is completed (step 202). The scan produces a set S, where S: $\{pr(1), pr(2) \ldots pr(M)\}$, and where M is the total number of access points. The wireless device may not receive signals from some reference devices and instead of reporting a signal strength, will report a not available (na) or no available number (nan).

Next, a subset of S, {APV}, can be formed comprising the reference devices from which a signal was received. That is, the reference devices that were seen in the scan are in set {APV} (step 204). Then for each of the calibration points, a subset, {APC(w)}, can be formed comprising the calibration points that report an RSSI from a reference device (step 206). Next, calibration points that contain exactly the same reference devices that were seen in the current scan and represented by the set {APV} are grouped together to form a group $G_n$ (step 208). That is, $G_n$ contains calibration points where {APC(w)}={APV}.

If $G_n$ is a null set, then the comparison calculation will be done as before, with the scan set S: $\{pr(1) \ldots pr(M)\}$ and each of the calibration points being used to calculate a Euclidean distance between the scan set and the calibration points. The calibration point closest to the scan point using the Euclidean distance formula is declared as the estimated location (step 210).

If the set $G_n$ is not empty, then the scan set S: $\{pr(1), \ldots pr(n)\}$ can be compared to the calibration points within the set $G_n$ (step 212). Again, the calibration point that is closest in distance can be chosen as the estimate for the location of the mobile unit (step 214).

The above method is an improvement over prior methods because by performing calculations within a subset of the calibration points the computational load is greatly reduced. However, there is the possibility that in this method an error can occur due to searching in the wrong cluster. Searching in the wrong cluster can be caused by noise, network traffic and newly installed reference devices. The problem of searching the wrong cluster can have three main causes. First, the current scan may include a reference device that was not seen by one or more of the calibration points during the survey. Second, the current scan may have missed a reference device it should have received a signal from because of noise or because the reference device was busy. Third, new reference devices can be installed after the survey.

As mentioned above, it can be possible that one or more calibration points may have missed a reference device during a survey because the reference device was interfered with by noise or heavy network traffic. However, as noted earlier when discussing the second lemma, the greater the RSSI from a reference device the greater the probability of a packet being received. Conversely, the RSSI of reference devices that were missed should not be very large because if the reference device had a high RSSI, the reference device should have been found during the survey.

For example, if an average RSSI of 8 for a reference device results in loss of signal 10% of the time, then the probability that the reference device will not be seen in N tries is $10^{-N}$. If the average RSSI of 5 results in loss of signal 90% of the time, then the probability that the reference device will not be seen in N tries is $0.9^{-N}$. For five scans in a survey, the probability that the reference device will not be seen by a calibration point if the average RSSI is 8 is $10^{-5}$ or 0.001%. For five (5) scans, the probability that the reference device will not be seen if the RSSI is five (5) is $0.9^5$ or 59%.

Therefore, by setting a threshold as a filter criteria and selecting reference devices that exceed a certain RSSI, the chance that there are reference devices missed in the survey that are seen in the scan can be greatly decreased. The threshold value to choose is a matter of choice and can be based on the number of scans taken during the survey and the relationship between RSSI and the probability of receiving a packet, the sensitivity or other parameters of the wireless receiver and the like.

Figure 2:
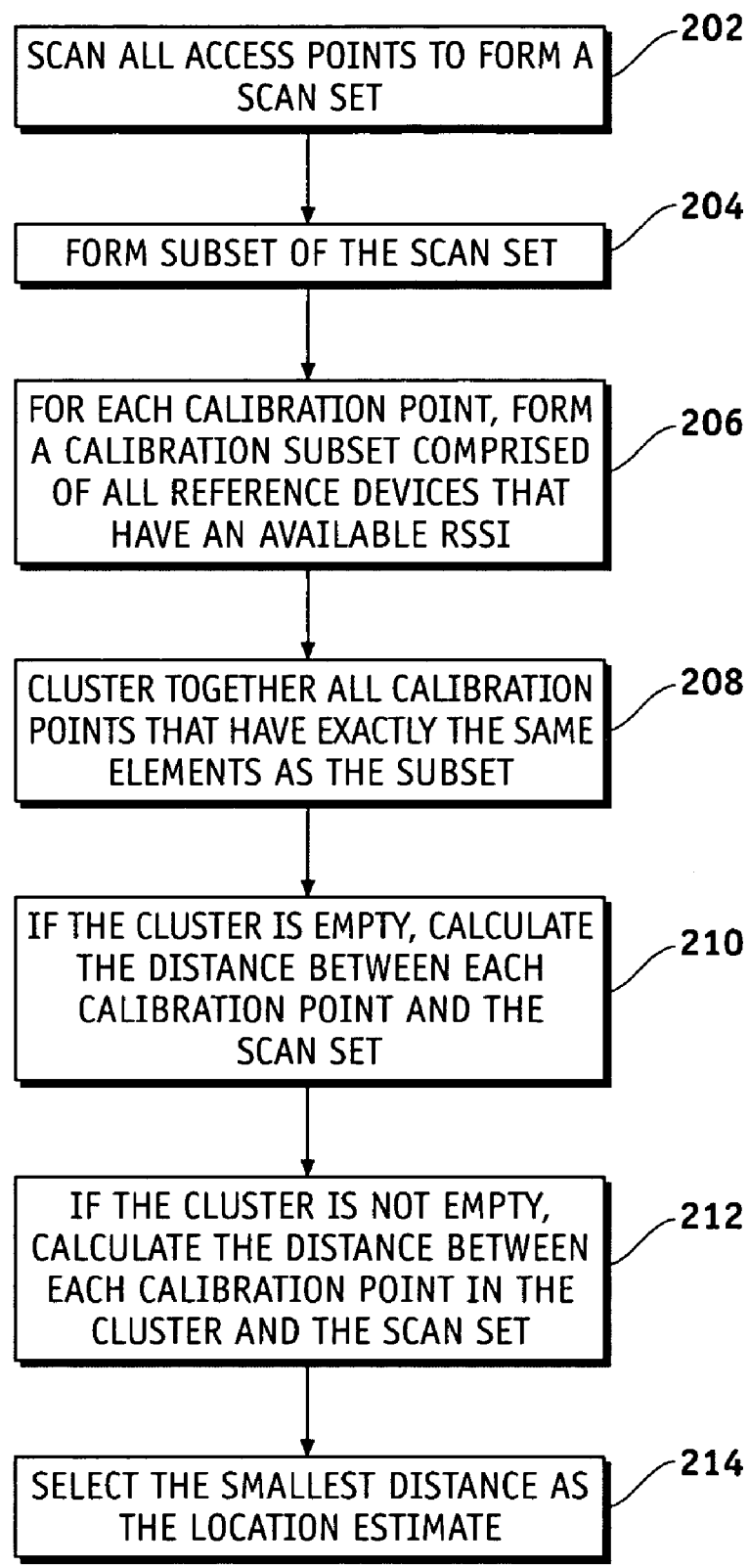
FIG. 2 is a flowchart of a clustering method in accordance with an exemplary embodiment of the present invention.

Another problem encountered in the first method discussed in conjunction with FIG. 2 is that the scan may not see a particular reference device seen by the calibration points because of either heavy network traffic or strong noise at the time of the scan. Because the first method as discussed in conjunction with FIG. 2 searched calibration points that see exactly the same set of reference devices as in the scan set, there can be a chance that the search for the calibration point will be conducted in the wrong cluster. To avoid this, the search "radius" (number of possible calibration points to search) can be increased by searching not the calibration points that have the same set of reference devices that received signals, but calibration points having at least the same reference devices. To avoid expanding the search radius too much, the number of additional reference devices above the amount in the scan set can be set to a fixed number, K, known also as the portion. In one embodiment, K can be set to be 10% of the total number of reference devices to limit the extra number of access points, although any value of K can be chosen. The larger the K value chosen, the larger the potential calculation overhead due to the larger size of the cluster in which to search. The selection of the portion K can, in one embodiment, be partially determined by the wireless channel information and the properties of the particular receiver.

To solve the problem of a scan reading signals from new reference devices that were not part of the survey, any RSSI value from an unknown reference device can be ignored.

Figure 3:
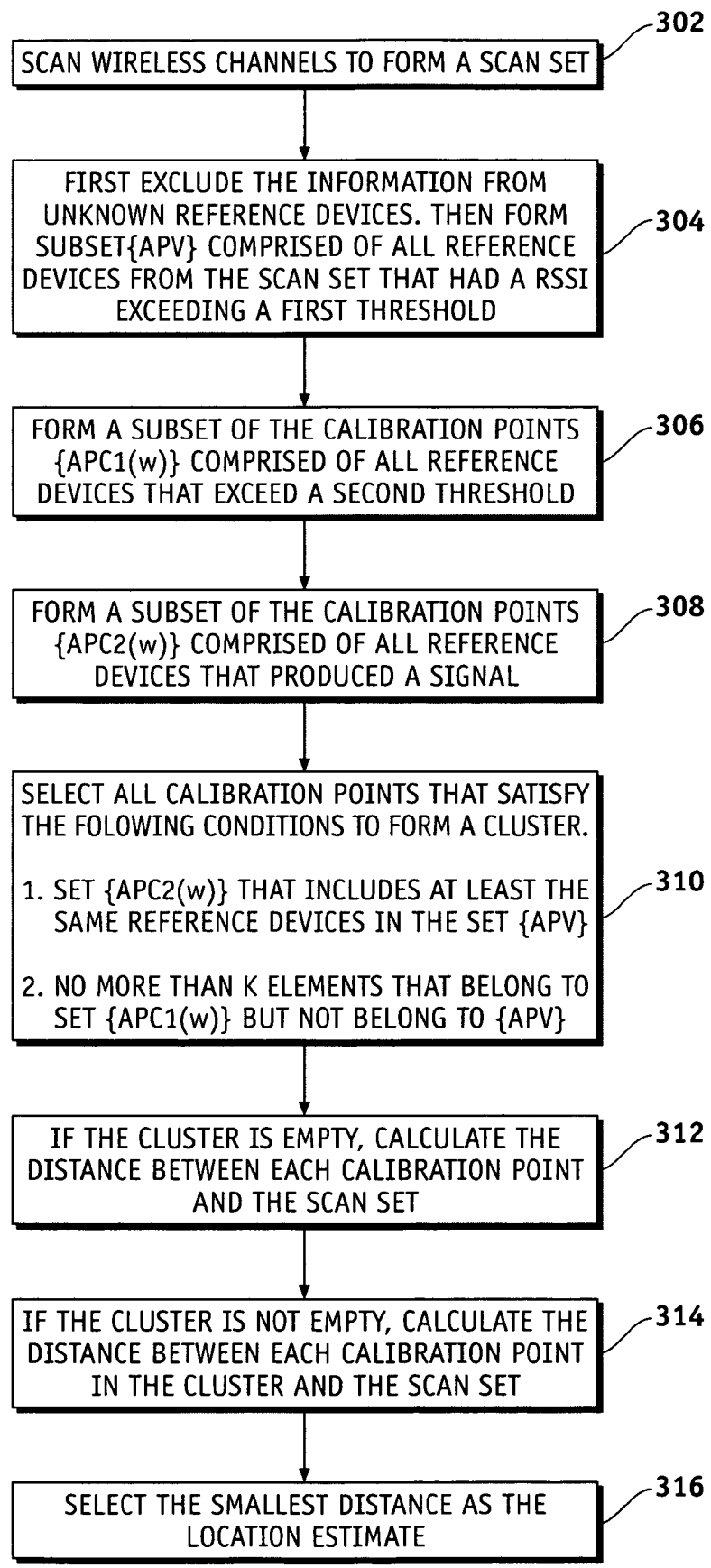
FIG. 3 is a flowchart of an adaptive clustering method in accordance with an exemplary embodiment of the present invention.

FIG. 3 is a flowchart illustrating a second exemplary method for location in accordance with the teachings of the present invention that implements using thresholds and increasing the search radius. In a first step, a scan is performed and a set S is formed, where S: {pr(1), pr(2) . . . pr(M)} (step 302). If the scan contains any information from an unknown reference device that does not belong to AP, the unknown reference device can be considered as a newly installed reference device and the RSSI from the newly found reference device will not be used to calculate Euclidean distance. Next, the reference devices in set S that have a RSSI exceeding a fixed, predetermined threshold, $Th_1$, are extracted to form a new set {APV} (step 304).

Next, for each of the calibration points a set can be formed comprising reference devices having a RSSI that exceed a certain threshold, $Th_2$ (step 306). This set can be labeled {$APC_1(w)$}. A second set can be formed for each calibration points comprising reference devices for which an RSSI is available (step 308). This set can be denoted {$APC_2(w)$}.

Once those sets are formed, calibration points where {APV}⊆{$APC_2(w)$} and where length($APC_1(w)$–$APC_1(w)$∩APV)≤K, will form a cluster, $G_n$. Note that length is a function that determines the number of elements in a set. Thus, length($APC_1(w)$–$APC_1(w)$∩APV) will result in the number of elements that belong to {$APC_1(w)$} and do not belong to {APV}.

Therefore, to form cluster $G_n$, calibration points in set {$APC_1(w)$} that includes at least the same reference devices in the set {APV} and the calibration points in set {$APC_1(w)$} that have no more than K elements than the number of elements in {$APC_1(w)$∩APV} are chosen.

If the cluster, $G_n$, is empty, then calibration points are used to calculate a series of Euclidean distances between the calibration points and the scan set. If there are calibration points within cluster $G_n$, then the Euclidean distance between the calibration point in cluster $G_n$ and the scan set can be used (step 308). The calibration point with the minimum distance from the scan set can be the location estimation. The Euclidean distance is calculated as:

$$d_w = \sqrt{\sum_{m=1}^{M} (p_r(n,m) - \{P_{rC}(m)\})^2}$$

Alternatively, to reduce computational load, the square of the distance can be calculated and the smallest value chosen as the location estimation.

$$d_w^2 = \sum_{m=1}^{M} (p_r(n,m) - \{P_{rC}(m)\})^2$$

In an example of the second method, assume that there are four reference devices and four calibration points distributed throughout an area. The radio map for the calibration points is shown in Table I.

| Calibration Points | Pr (w, 1) | Pr (w, 2) | Pr (w, 3) | Pr (w, 4) |
|---|---|---|---|---|
| w = 1 ($X_1$, $Y_1$, $Z_1$) | 10 | NAN | NAN | NAN |
| w = 2 ($X_2$, $Y_2$, $Z_2$) | 9 | 21 | 7 | 5 |
| w = 3 ($X_3$, $Y_3$, $Z_3$) | 12 | 22 | 7 | 21 |
| w = 4 ($X_4$, $Y_4$, $Z_4$) | 13 | 21 | 8 | 5 |

Also, assume that the current scan is S: {12, 23, 5, nan} and $Th_1$=10, $Th_2$=20, and K=0.

First, a subset, {APV}, of the current scan is formed using the reference devices which have an RSSI exceeding $Th_1$, which in this example is 10. Thus {APV}={$AP_1$, $AP_2$}.

Next, a subset, {$APC_1(w)$}, for each calibration point is formed using reference devices that have an RSSI exceeding a threshold. In this step the threshold is $Th_2$, which in this example is 20.

{$APC_1(1)$}={ }; {$APC_1(2)$}={$AP_2$}; {$APC_1(3)$}={$AP_2$, $AP_4$}; {$APC_1(4)$}={$AP_2$}

Next, another subset, {$APC_2(w)$}, for each calibration point is formed using reference devices have available signal strength for that calibration point.

{$APC_2(1)$}={$AP_1$}; {$APC_2(2)$}={$AP_1$, $AP_2$, $AP_3$, $AP_4$}; {$APC_2(3)$}={$AP_1$, $AP_2$, $AP_3$, $AP_4$}; {$APC_2(4)$}={$AP_1$, $AP_2$, $AP_3$, $AP_4$}

Next, the calibration points from the subsets {$APC_1(w)$} and {$APC_2(w)$} are used to form a cluster. The cluster will contain calibration points where: {APV}⊆{$APC2(w)$} and length({$APC_1(W)$}–{$APC_1(W)$}∩{APV})≤K.

Considering {APV⊆$APC_2(w)$}, $APC_2(1)$ is eliminated from consideration since $APC_2(1)$} only has $AP_1$ as part of the set.

Next, length($APC_1(w)$–{$APC_1(w)$}∩{APV}) is determined:

For w=2, length ({$APC_1(2)$}–{$APC_1(2)$}∩{APV})
=length ({ })=0

For w=3, length ({$APC_1(3)$}–{$APC_1(3)$}∩{APV})
=length ({$AP_4$})=1

For w=4, length ({$APC_1(4)$}–{$APC_1(4)$}∩{APV}=length ({ })=0

Since K=0, the third calibration point is eliminated from contention. Therefore, $G_n$={calibration point 2, calibration point 4}. Now, the Euclidean distance between the set {APV} and the calibration points in $G_n$ will be calculated using:

$$d_w = \sqrt{\sum_{m=1}^{M} (p_r(n,m) - \{P_{rC}(m)\})^2}$$

For w=2:

$d_2=\sqrt{(12-9)^2+(23-21)^2+(5-7)^2}$ $d_2$=4.12

And for w=4

$d_4=\sqrt{(12-12)^2+(23-22)^2+(5-7)^2}$ $d_4$=3.74

The smallest distance is $d_4$; therefore $d_4$ is the location estimate. Alternatively, the square of the distance could be calculated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for determining a location estimation of a wireless device in a wireless location system having a plurality of reference devices, the method comprising:
   receiving signals from one or more of the plurality of reference devices at the wireless device;
   forming a first set comprising a plurality of elements, each element of the plurality of elements comprising a signal strength measurements of signals received at the wireless device from each of the plurality of reference devices from which the wireless device receives signals and an indicator of no signal strength measured for each of the plurality of reference devices from which the wireless device does not receive signals;
   forming a scan subset comprising each of the plurality of reference devices in the first set that has an associated signal strength measurement;
   forming a cluster set comprising calibration points selected from a plurality of calibration points based on the scan subset, wherein the plurality of calibration points comprise a set of received signal strength measurements from signals received at the calibration points from each of the plurality of reference devices; and
   calculating a calculated distance between the first set and each of the calibration points in the cluster set, when the cluster set has at least one element;
   calculating the calculated distance between the first set and each of the plurality of calibration points, when the cluster set has no elements; and
   selecting the calibration point having the smallest calculated distances as the location estimation.

2. The method of claim 1 wherein the step of forming a cluster set further comprises forming a cluster set comprising calibration points selected from the plurality of calibration points that contain exactly the same reference devices as the scan subset.

3. The method of claim 1 wherein the step of forming a first set further comprises detecting newly installed reference devices by identifying signals from reference devices that did not appear in any calibration point within the plurality of calibration points.

4. The methods of claim 1 wherein the step of forming a scan subset further comprises forming a scan subset comprising each of the plurality of reference devices in the first set that has an associated signal strength measurement above a fixed threshold.

5. A system for estimating a location of a wireless device in a wireless network comprising:
   a plurality of reference devices distributed throughout the wireless network, each of the plurality of reference devices operable to send a signal;
   a plurality of calibration points distributed throughout the wireless network, the calibration points comprising a set of received signal strength measurements from signals received from each of the plurality of reference devices; and
   the wireless device located in the network, the wireless device configured to:
      form a scan set comprising a received signal strength indicator (RSSI) value from each of the plurality of reference devices from which the wireless device receives signals from and an indicator of no signal received from each of the plurality of reference devices that the wireless device does not receive signals as elements of the scan set;
      form a scan subset of the scan set comprising reference devices in the scan set that have associated signal strength;
      form a cluster set comprising calibration points selected from the plurality of calibration points based on the scan subset;
      determine an estimated location by selecting the smallest distance between the scan subset and each of the calibration points in the cluster set, when the cluster set has at least one element; and
      determine an estimated location by selecting the smallest distance between the scan subset and each of the plurality of calibration points, when the cluster set has no elements.

6. The system of claim 5 wherein the cluster set comprises calibration points selected from the plurality of calibration points that contain the exact same reference devices as the scan subset.

7. The system of claim 6 wherein the scan set contains reference devices having an RSSI above a fixed threshold.

8. The system of claim 5 wherein any reference devices in the scan set that are not in the plurality of calibration points are considered newly installed reference devices.

9. The system of claim 5 wherein the wireless device is a radio frequency identification tag.

10. The system of claim 5 wherein the wireless device is a handheld computer unit.

11. The system of claim 5 wherein the wireless device is a computer with a wireless network transceiver.

12. The system of claim 5 wherein the distance is calculated as the square of the distance between the scan subset and each of the calibration points in the system.

13. The system of claim 5 wherein the reference device comprises an access point of a wireless network.

14. A wireless device for use in a wireless network, the wireless device comprising:
   a memory configured to store a plurality of calibration points, each of the plurality of calibration points including a set of received signal strength indicator (RSSI) values for signals received from each of a plurality of reference devices;
   a receiver configured to receive signals from one or more of the plurality of reference devices; and
   a processor coupled to the receiver and the memory, the processor operable to:
      determine RSSI values for each of the signals received from the one or more of the plurality of reference devices;
      form a scan set comprising the RSSI value from each of the plurality of reference devices that the receiver received signals from and further comprising an indicator of no signal received from each of the plurality of reference devices that the receiver did not receive signals;

form a scan subset comprising reference devices in the scan set that have an associated RSSI value;

form a cluster set comprising calibration points selected from the plurality of calibration points based on the scan set;

determine an estimated location by selecting the smallest distance between the scan subset and each of the calibration points of the cluster set, when the cluster set has at least one element; and determine an estimated location by selecting the smallest distance between the scan subset and each of the plurality of calibration points, when the cluster set has no elements.

15. The device of claim 14 wherein the wireless device is part of a radio frequency identification tag.

16. The device of claim 14 wherein the wireless device is a wireless data entry terminal.

17. A method for estimating a location of a wireless device in a wireless location system having a plurality of reference devices and a plurality of calibration points, each of the calibration points associated with a set of received signal strength measurements received at the calibration point from each of the plurality of reference devices from which a signal can be receive, the method comprising:

forming a first set comprising a plurality of elements, each element of the plurality of elements corresponding to signal strength measurements of signals received at the wireless device from each of the plurality of reference devices from which the wireless device receives signals and an indicator of no signal strength measured for any of the plurality of reference devices from which the wireless device does not receive signals:

forming a scan subset comprising each of the plurality of reference devices in the first set that has an associated signal strength measurement above a first fixed threshold;

forming a cluster set by:

forming one or more first calibration subset for each calibration point comprising reference devices that have an associated signal strength above a second fixed threshold;

forming one or more second calibration subset for each calibration point comprising reference devices having an available received signal strength indicator;

selecting calibration points that include reference devices that are in the scan subset and contained in the one or more second calibration subset and where a difference between the number of reference devices that belong to the one or more first calibration subset that do not belong to the intersection of the reference devices in the scan subset and the reference devices in the one or more first calibration subset is equal to or does not exceed a fixed portion of the total reference devices; and calculating a calculated distance between the first set and each of the calibration points in the cluster set when the cluster set has at least one element;

calculating the calculated distance between the first set and each of the plurality of calibration points when the cluster set has no elements; and selecting the smallest of the calculated distances as a location estimate.

18. A wireless device for use in a wireless network, the wireless device comprising:

a memory configured to store a plurality of calibration points, each of the plurality of calibration points including a set of received signal strength indicator (RSSI) values for signals received from each of a plurality of reference devices;

a receiver configured to receive signals from one or more of the plurality of reference devices; and a processor coupled to the receiver and the memory, the processor operable to:

determine a received signal strength indicator (RSSI) value for each of the signals received from the one or more of the plurality of reference devices;

form a scan set comprising the RSSI value from each of the plurality of reference devices that the receiver received a signal from and further comprising an indicator of no signal received from each of the plurality of reference devices that the receiver did not receive a signal;

form a scan subset comprising reference devices in the scan set that have an associated RSSI value above a first fixed threshold;

form one or more first calibration subset for each calibration point comprising reference devices that has an associated signal strength above a second fixed threshold; and form one or more second calibration subset for each calibration subset comprising reference devices having an available received signal strength indicator (RSSI); and form a cluster set by selecting calibration points that include reference devices that are in the scan subset and contained in the one or more second calibration subset and where a difference between the number of reference devices that belong to the one or more first calibration subset that do not belong to the intersection of the reference devices in the scan subset and the reference devices in the one or more first calibration subset is less than or equal to a fixed portion of the total reference devices; and determine an estimated location by selecting the smallest distance between the scan subset and each of the calibration points of the cluster set when the cluster set has at least one element; and determine an estimated location by selecting the smallest distance between the scan subset and each of the plurality of calibration points when the cluster set has no elements.

* * * * *

UNITED STATES PATENT AND TRADEMARK OFFICE
CERTIFICATE OF CORRECTION

| | | |
|---|---|---|
| PATENT NO. | : 7,155,239 B2 | Page 1 of 1 |
| APPLICATION NO. | : 10/856965 | |
| DATED | : December 26, 2006 | |
| INVENTOR(S) | : Guang Zeng, David P. Goren and Hoai Xuan Vu | |

It is certified that error appears in the above-identified patent and that said Letters Patent is hereby corrected as shown below:

Claim 17, column 11, line 27, delete the word "receive" and insert the word --received--.

Signed and Sealed this

Fifteenth Day of May, 2007

JON W. DUDAS
*Director of the United States Patent and Trademark Office*